United States Patent
Kaneda et al.

(10) Patent No.: US 12,261,293 B2
(45) Date of Patent: Mar. 25, 2025

(54) POSITIVE ELECTRODE ACTIVE MATERIAL FOR LITHIUM ION SECONDARY BATTERY AND LITHIUM ION SECONDARY BATTERY

(71) Applicant: SUMITOMO METAL MINING CO., LTD., Tokyo (JP)

(72) Inventors: Haruki Kaneda, Niihama (JP); Yuki Koshika, Niihama (JP); Yuki Furuichi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 425 days.

(21) Appl. No.: 17/637,938

(22) PCT Filed: Aug. 28, 2020

(86) PCT No.: PCT/JP2020/032776
§ 371 (c)(1),
(2) Date: Feb. 24, 2022

(87) PCT Pub. No.: WO2021/040033
PCT Pub. Date: Mar. 4, 2021

(65) Prior Publication Data
US 2022/0285676 A1 Sep. 8, 2022

(30) Foreign Application Priority Data

Aug. 30, 2019 (JP) .................................. 2019-157719
Aug. 30, 2019 (JP) .................................. 2019-157720

(51) Int. Cl.
*H01M 4/505* (2010.01)
*C01G 53/42* (2025.01)
(Continued)

(52) U.S. Cl.
CPC ............ *H01M 4/505* (2013.01); *C01G 53/42* (2013.01); *C01G 53/44* (2013.01); *H01M 4/525* (2013.01);
(Continued)

(58) Field of Classification Search
None
See application file for complete search history.

(56) References Cited

U.S. PATENT DOCUMENTS 9,786,913 B2    10/2017 Inoue et al.
2003/0211396 A1  11/2003 Kobayashi et al.
(Continued)

FOREIGN PATENT DOCUMENTS

CN    105765770 A    7/2016
CN    106450155 A    2/2017
(Continued)

OTHER PUBLICATIONS

Machine Translation of WO 2014175191A1 (Year: 2014).*
(Continued)

*Primary Examiner* — Gregg Cantelmo
(74) *Attorney, Agent, or Firm* — WHDA, LLP

(57) ABSTRACT

A positive electrode active material for a lithium ion secondary battery, the positive electrode active material including a lithium-nickel composite oxide having a hexagonal layered structure and configured by single primary particles or by single primary particles and secondary particles with a plurality of aggregated primary particles, wherein a number proportion of the single primary particles to all of the particles is 30% or more, a ratio of a (003) diffraction peak intensity $I_{(003)}$ to a (104) diffraction peak intensity $I_{(104)}$ ($I_{(003)}/I_{(104)}$) is 2.0 or more, and a degree of circularity is 0.93 or more and 1.00 or less.

4 Claims, 4 Drawing Sheets

(51) Int. Cl.
  *C01G 53/44*   (2025.01)
  *H01M 4/02*    (2006.01)
  *H01M 4/525*   (2010.01)
  *H01M 10/0525* (2010.01)

(52) U.S. Cl.
  CPC ..... *H01M 10/0525* (2013.01); *C01P 2002/50* (2013.01); *C01P 2002/74* (2013.01); *C01P 2002/76* (2013.01); *C01P 2004/03* (2013.01); *C01P 2004/50* (2013.01); *C01P 2004/61* (2013.01); *C01P 2004/62* (2013.01); *C01P 2006/12* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2012/0258365 A1 | 10/2012 | Yokoyama et al. |
| 2015/0086787 A1 | 3/2015 | Yura et al. |
| 2015/0380737 A1* | 12/2015 | Kawasato ............ H01M 4/505 252/521.2 |
| 2016/0293952 A1 | 10/2016 | Kaneda et al. |
| 2018/0083262 A1 | 3/2018 | Zhou et al. |
| 2018/0309306 A1 | 10/2018 | Kanada et al. |
| 2019/0252681 A1 | 8/2019 | Kaneda et al. |
| 2020/0052295 A1 | 2/2020 | Koshika et al. |
| 2020/0106098 A1 | 4/2020 | Kobayashi |
| 2020/0295365 A1 | 9/2020 | Saitou et al. |
| 2022/0112095 A1 | 4/2022 | Kobayashi |

FOREIGN PATENT DOCUMENTS

| | | | |
|---|---|---|---|
| CN | 108137347 A | 6/2018 | |
| CN | 109546081 A | 3/2019 | |
| CN | 109560276 A | 4/2019 | |
| CN | 110121481 A | 8/2019 | |
| CN | 110422892 A | 11/2019 | |
| JP | 2001-015108 A | 1/2001 | |
| JP | 2001167761 A * | 6/2001 | |
| JP | 2001-243949 A | 9/2001 | |
| JP | 2002128526 A * | 5/2002 | |
| JP | 2004-355824 A | 12/2004 | |
| JP | 2016-162748 A | 9/2016 | |
| JP | 2017-188444 A | 10/2017 | |
| JP | 2017-188445 A | 10/2017 | |
| WO | 2012137535 A1 | 10/2012 | |
| WO | 2014038394 A1 | 3/2014 | |
| WO | WO-2014175191 A1 * | 10/2014 | ............ C01G 53/006 |
| WO | WO-2017061633 A1 * | 4/2017 | ............ C01G 53/42 |
| WO | 2017/169129 A1 | 10/2017 | |
| WO | 2018/021557 A1 | 2/2018 | |

OTHER PUBLICATIONS

Machine Translation of WO 2017061633A1 (Year: 2017).*
Abstract of JP-2001167761-A (Year: 2001).*
Abstract of JP-2002128526-A (Year: 2002).*
International Search Report dated Nov. 17, 2020, issued in Application No. PCT/JP2020/032774, with English Translation (counterpart to U.S. Appl. No. 17/637,914). (5 pages).
International Preliminary Report on Patentability (Form PCT/IB/373) issued in International Application No. PCT/JP2020/032774 dated Mar. 1, 2022, with Form PCT/ISA/237 (counterpart to U.S. Appl. No. 17/637,914). (10 pages).
Extended (Supplementary) European Search Report dated Aug. 29, 2023, issued in U.S. Appl. No. 17/637,925 (counterpart to U.S. Appl. No. 17/637,925). (8 pages).
International Search Report dated Nov. 17, 2020, issued in counterpart Application No. PCT/JP2020/032775, with English Translation (counterpart to U.S. Appl. No. 17/637,925). (5 pages).
International Preliminary Report on Patentability (Form PCT/IB/373) issued in counterpart International Application No. PCT/JP2020/032775 dated Mar. 1, 2022, with Form PCT/ISA/237 (counterpart to U.S. Appl. No. 17/637,925). (20 pages).
Related co-pending U.S. Appl. No. 17/637,914 and U.S. Appl. No. 17/637,914.
Office Action dated Jan. 3, 2024, issued in CN Application No. 202080060796.3, with English translation. (13 pages).
Office Action dated Jan. 4, 2024, issued in CN Application No. 202080060892.8, with English translation. (13 pages).
Office Action dated Dec. 21, 2023, issued in CN Application No. 202080060785.5, with English translation. (19 pages).
Nakamura, T. et al., "Fablication and Electrochemical Characteristics of Orientation-Controlled Li(Ni, Mn, Co)O2 Cathode Particles", The 57th Battery Symposium in Japan, Nov. 28, 2016; (3 pages).
International Search Report dated Nov. 4, 2020, issued in counterpart Application No. PCT/JP2020/032776, with English Translation. (6 pages).
International Preliminary Report on Patentability (Form PCT/IB/373) issued in counterpart International Application No. PCT/JP2020/032776 dated Mar. 1, 2022, with Form PCT/ISA/237. (10 pages).
Extended (Supplementary) European Search Report dated Nov. 6, 2023, issued in counterpart EP Application No. 20856847.7. (7 pages).
Extended (Supplementary) European Search Report dated Nov. 6, 2023, issued in U.S. Appl. No. 17/637,914 (Counterpart to U.S. Appl. No. 17/637,914). (8 pages).
Office Action dated Jul. 24, 2024, issued in counterpart CN application No. 202080060785.5, with English translation. (21 pages).
Non-Final dated Aug. 21, 2024, issued in U.S. Appl. No. 17/637,925 (26 pages).
Non-Final dated Aug. 21, 2024, issued in U.S. Appl. No. 17/637,914 (26 pages).

* cited by examiner

POSITIVE ELECTRODE ACTIVE MATERIAL FOR LITHIUM ION SECONDARY BATTERY AND LITHIUM ION SECONDARY BATTERY

TECHNICAL FIELD

The present invention relates to a positive electrode active material for a lithium ion secondary battery and a lithium ion secondary battery.

BACKGROUND ART

In recent years, with widespread use of a portable electronic device such as a mobile phone terminal or a notebook personal computer, development of a small and lightweight non-aqueous electrolyte secondary battery having a high energy density and durability has been strongly desired. Furthermore, development of high output secondary batteries as batteries for electric tools and electric cars including hybrid cars has been strongly desired.

As a secondary battery satisfying such requirement, there is a non-aqueous electrolyte secondary battery such as a lithium ion secondary battery. A lithium ion secondary battery using a lithium-metal composite oxide having a layered or spinel type crystal structure as a positive electrode active material can obtain a high voltage of 4 V-class and therefore has been put into practical use as a battery having a high energy density.

As the lithium-metal composite oxide, lithium-cobalt composite oxide ($LiCoO_2$) that is relatively easily synthesized, lithium-nickel composite oxide ($LiNiO_2$) using nickel that is cheaper than cobalt, lithium-nickel-cobalt-manganese composite oxide ($LiNi_{1/3}Co_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$), and the like have been proposed.

Among them, the lithium-nickel composite oxide capable of realizing a secondary battery having a high battery capacity without using cobalt, which is a resource lying under the ground in a small amount, has attracted attention in recent years as a material having a high energy density. However, the lithium-nickel composite oxide has a problem that as discharge is repeated, the battery capacity decreases more when the lithium-nickel composite oxide is used than when another lithium-metal composite oxide is used, that is, a problem of the poor cycle characteristic, and a problem of large expansion of the battery due to gas generation at the time of repeating charge and discharge.

The lithium-nickel composite oxide is usually configured by secondary particles with a plurality of aggregated primary particles. Here, one reason that the cycle characteristic of a secondary battery deteriorates as charge and discharge are repeated is that expansion and shrinkage of the secondary battery during charge and discharge cause cracking, deformation, or destruction of the secondary particle (see Patent Literature 1 and 2).

Cracking of the secondary particle is considered to occur from an interface (grain boundary) between the primary particles. Therefore, it is expected that the cycle characteristic is improved by reducing interfaces between the primary particles in the lithium-nickel composite oxide, that is, by making the lithium-nickel composite oxide include single primary particles or a secondary particle with a small number of aggregated primary particles.

For example, Patent Literature 1 proposes a lithium-transition metal composite oxide for a lithium secondary battery positive electrode active material in which primary particles are aggregated to form a secondary particle, and the ratio of the average particle size of the secondary particle to the average particle size of the primary particles is 1 or more and 5 or less. According to Patent Literature 1, a lithium-transition metal composite oxide can be obtained that can suppress, when used as a positive electrode active material, cycle deterioration of the lithium secondary battery caused by repeating charge and discharge to a small level due to the above-described action.

Patent Literature 2 proposes a positive electrode active material, for a non-aqueous secondary battery, that is a powdery lithium composite oxide including monodisperse primary particles containing one element selected from the group consisting of Co, Ni, and Mn and lithium as main components, and has an average particle size (D50) of 3 to 12 μm, a specific surface area of 0.2 to 1.0 m²/g, a bulk density of 2.1 g/cm³ or more, and an inflection point, in the volume reduction rate obtained with a Cooper plot method, of not less than 3 ton/cm². According to Patent Literature 2, by controlling a lithium composite oxide as a primary particle, a positive electrode active material for a non-aqueous secondary battery including primary particles and a positive electrode can be provided that are capable of maintaining a high bulk density and a battery characteristic and preventing a crack.

Patent Literature 3 proposes a method for producing a positive electrode active material for a non-aqueous electrolyte secondary battery, including: preparing composite oxide particles having a volume-based cumulative particle size distribution in which a ratio of the particle size at 90%, $^1D_{90}$, to the particle size at 10%, $^1D_{10}$, that is, $^1D_{90}/^1D_{10}$, is 3 or less and containing nickel; obtaining a raw material mixture containing the composite oxide particles and a lithium compound and having a ratio of the total number of moles of lithium to the total number of moles of the metal element contained in the composite oxide of 1 or more and 1.3 or less; heat-treating the raw material mixture to obtain a heat-treated product; subjecting the heat-treated product to a dry dispersion treatment to obtain a first dispersion; and bringing the first dispersion into contact with a liquid medium to obtain a second dispersion, wherein the positive electrode active material contains lithium-transition metal composite oxide particles having a ratio of the particle size at 50% in the volume-based cumulative particle size distribution, $^2D_{50}$, to the average particle size obtained by electron microscope observation, $^2D_{SEM}$, that is, $^2D_{50}/^2D_{SEM}$, of 1 or more and 4 or less, and having a composition represented by Formula (1) described below.

$$Li_pNi_xCo_yM^1_zO_{2+\alpha} \tag{1}$$

In Formula (1), p, x, y, z, and α satisfy 1.0≤p≤1.3, 0.6≤x<0.95, 0≤y≤0.4, 0≤z≤0.5, x+y+z=1, and −0.1≤α≤0.1, and $M^1$ represents at least one of Mn or Al.

According to Patent Literature 3, an efficient production method can be provided to obtain a positive electrode active material containing lithium-transition metal composite oxide particles including single particles or secondary particles each including a small number of primary particles.

Patent Literature 4 proposes a positive electrode active material for a non-aqueous electrolyte secondary battery, including a group of lithium-transition metal composite oxide particles having an average particle size obtained by electron microscope observation, $D_{SEM}$, of 1 μm or more and 7 μm or less, a ratio of the particle size at 50% in the volume-based cumulative particle size distribution, $D_{50}$, to the average particle size obtained by electron microscope observation, that is, $D_{50}/D_{SEM}$, of 1 or more and 4 or less, and a ratio of the particle size at 90%, $D_{90}$, to the particle size at 10%, $D_{10}$, in the volume-based cumulative particle size distribution, that is, $D_{90}/D_{10}$, of 4 or less, wherein the lithium-transition metal composite oxide contains nickel in its composition and has a layered structure. According to Patent Literature 5, a positive electrode active material for a non-aqueous electrolyte secondary battery can be provided that is capable of achieving both a high output characteristic and high durability.

Patent Literature 5 proposes a positive electrode active material for a secondary battery, including a lithium-nickel composite oxide that has a layered rock salt structure, a composition formula $Li_xNi_yM_zO_2$ (wherein M is at least one metal element selected from the group consisting of Co, Al, Mg, Ca, Cr, Mo, Si, Ti, and Fe, and x, y, and z satisfy $0.95 \leq x \leq 1.05$, $0.8 \leq y \leq 1$, $0 \leq z \leq 0.2$, and $y+z=1$), and a full width at half maximum of the diffraction peak of the (104) plane in the X-ray diffraction pattern, n, of 0.13° or less, and having a content of the positive electrode active material having a particle size of 3.41 μm or less of 2 vol % or less based on the total amount of the positive electrode active material contained in the positive electrode.

According to Patent Literature 5, the layered oxide, in the cited Literature 5, having a full width at half maximum, n, of 0.13° or less includes single crystal grains having a sufficiently large particle size and has a size such that the layered oxide can be used as it is as a positive electrode active material, so that there is no possibility of durability deterioration due to particle cracking that may occur in a secondary particle formed by aggregation of primary particles, and a secondary battery having further improved durability can be produced by using the layered oxide having a full width at half maximum, n, of 0.13° or less as a positive electrode active material.

CITATION LIST

Patent Literature

Patent Literature 1: JP 2001-243949 A
Patent Literature 2: JP 2004-355824 A
Patent Literature 3: JP 2017-188444 A
Patent Literature 4: JP 2017-188445 A
Patent Literature 5: WO 2017/169129 A

SUMMARY OF INVENTION

Technical Problem

Patent Literature 1 to 5 described above describes that the cycle characteristic is improved by controlling the number, the particle size, the particle size distribution, and the like of the primary particles included in the lithium-metal composite oxide, but further improvement in the cycle characteristic is required in a secondary battery using a lithium-nickel composite oxide as a positive electrode.

The present invention has been achieved in view of these circumstances. An object of the present invention is to provide a positive electrode active material, for a lithium ion secondary battery, that contains a lithium-nickel composite oxide and is capable of improving the cycle characteristic when used in a positive electrode of a secondary battery.

Solution to Problem

According to a first aspect of the present invention, there is provided a positive electrode active material for a lithium ion secondary battery, the positive electrode active material including a lithium-nickel composite oxide having a hexagonal layered structure and configured by single primary particles or by single primary particles and secondary particles with a plurality of aggregated primary particles, wherein a number proportion of the single primary particles to all of the particles is 30% or more, metal elements constituting the lithium-nickel composite oxide include lithium (Li), nickel (Ni), and optionally at least one element M (M) selected from the group consisting of Co, Mn, Al, V, Mg, Mo, Ca, Cr, Zr, Ti, Nb, Na, K, W, Fe, Zn, B, Si, P, and Ta, a mole number ratio of the metal elements is represented as Li:Ni:M=a:b:c (provided that, $0.95 \leq a \leq 1.10$, $0.30 \leq b \leq 1.00$, $0.00 \leq c \leq 0.70$, and $b+c=1$), a ratio of a (003) diffraction peak intensity $I_{(003)}$ to a (104) diffraction peak intensity $I_{(104)}$ ($I_{(003)}/I_{(104)}$) is 2.0 or more and the (003) diffraction peak intensity and the (104) diffraction peak intensity are determined from X-ray diffraction measured using a flat plate sample holder of a Bragg Brentano optical system using a Cu-kα ray as an X-ray source, and a degree of circularity determined with a flow type image analysis method using a wet flow type particle size/shape analyzer is 0.93 or more and 1.00 or less.

The positive electrode active material preferably has a volume-based median diameter (D50) of 10 μm or less, and the lithium-nickel composite oxide preferably has an average primary particle size of 0.3 μm or more. The positive electrode active material preferably has a specific surface area determined with a nitrogen adsorption method of 1.0 m²/g or more and 5.0 m²/g or less.

According to a second aspect of the present invention, there is provided a lithium ion secondary battery including, at least, a positive electrode, a negative electrode, and a non-aqueous electrolyte, the positive electrode containing the above-described positive electrode active material for a lithium ion secondary battery.

Advantageous Effects of Invention

According to the present invention, it is possible to provide a positive electrode active material, for a lithium ion secondary battery, that is capable of improving the cycle characteristic when used in a positive electrode of a secondary battery.

DESCRIPTION OF EMBODIMENTS

Figure 1:
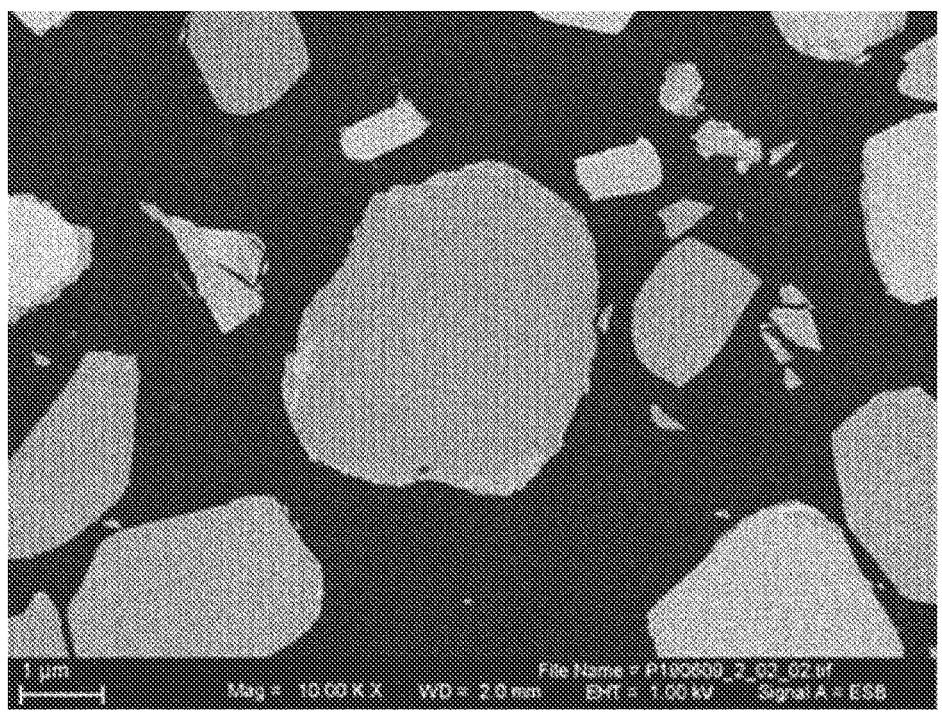
FIG. 1 is a scanning electron microscope (SEM) observation image of a cross section of a positive electrode active material in Example 1.

Hereinafter, regarding the present embodiment, a positive electrode active material for a lithium ion secondary battery, a method for producing the same, and a lithium ion secondary battery using the positive electrode active material will be described.

1. Positive Electrode Active Material for Lithium Ion Secondary Battery

A positive electrode active material for a lithium ion secondary battery (hereinafter, also referred to as "positive electrode active material") according to the present embodiment contains a lithium-nickel composite oxide containing at least lithium and nickel. The lithium-nickel composite oxide is configured by single primary particles or by single primary particles and secondary particles with a plurality of aggregated primary particles. The positive electrode active material according to the present embodiment can improve the cycle characteristic when used in a positive electrode of a secondary battery. Hereinafter, a configuration of the positive electrode active material according to the present embodiment will be described in detail.

[Lithium-Nickel Composite Oxide]
(Primary Particles and Secondary Particles)

The lithium-nickel composite oxide according to the present embodiment has a hexagonal layered structure and is configured by single primary particles or by single primary particles and secondary particles with a plurality of aggregated primary particles. The lithium-nickel composite oxide may be configured by only single primary particles or may be configured by both single primary particles and secondary particles.

The number proportion of the single primary particles to all of the particles in the lithium-nickel composite oxide is preferably 30% or more, more preferably 50% or more, and still more preferably 70% or more. The number proportion of the single primary particles may be 90% or more, and may be 100%. When the number proportion of the primary particles is 100%, the lithium-nickel composite oxide is configured by only single primary particles.

The number of primary particles configuring a secondary particle of the lithium-nickel composite oxide is preferably small, and specifically, the number of primary particles configuring a secondary particle is preferably 15 or less, and more preferably 10 or less.

The number proportion of the single primary particles is determined as follows. Each of 100 or more particles of the lithium-nickel composite oxide contained in the positive electrode active material is examined to determine whether configured by a single primary particle or a secondary particle (with a plurality of aggregated primary particles), and the proportion of the number of particles determined to be a single primary particle to the number of all particles examined (total number of particles) is calculated to determine the number proportion of the single primary particles. Whether each particle is configured by a primary particle or a secondary particle is preferably determined as follows. A cross section of each particle of the lithium-nickel composite oxide is processed, and the scanning electron microscope (SEM) observation image (hereinafter, also simply referred to as "SEM image") of the cross section is used for the determination. This is because although simple determination is possible using an SEM image of the outer shape of each particle, such simple determination may lack accuracy.

Figure 2:
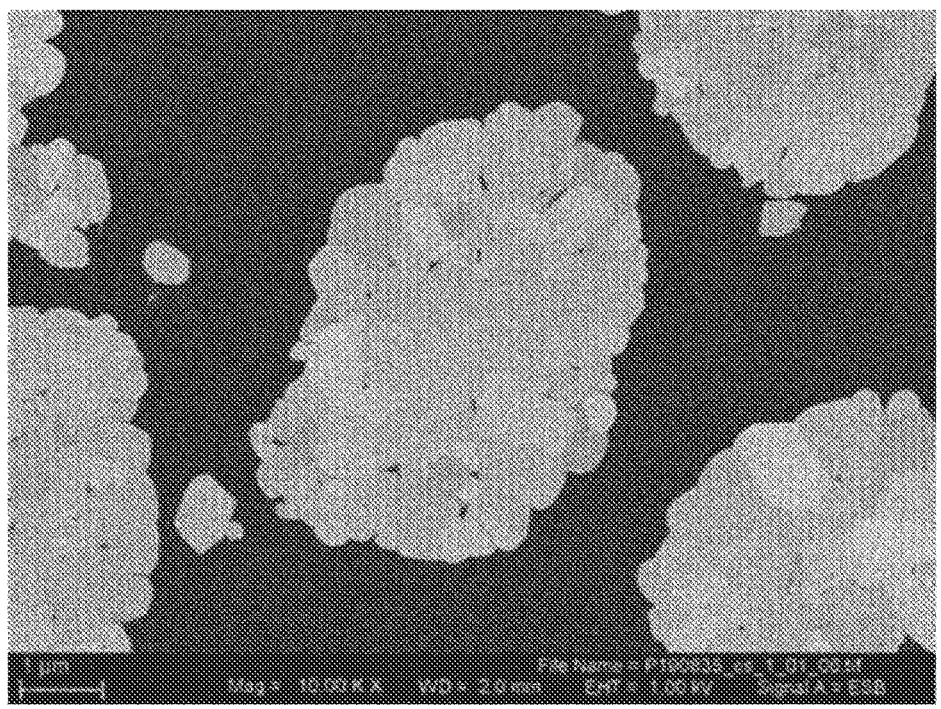
FIG. 2 is an SEM observation image of a cross section of a positive electrode active material in Comparative Example 7.

For example, FIG. 1 is an SEM image of a cross section of particles included in a positive electrode active material in Example 1 described below, and FIG. 2 is an SEM image of a cross section of particles included in a positive electrode active material in Comparative Example 7 described below. As shown in FIG. 1, the positive electrode active material according to the present embodiment includes a plurality of single primary particles.

To determine whether a particle is configured by a single primary particle or a secondary particle, a band contrast can be used that is obtained with an electron backscatter diffraction (hereinafter, also referred to as EBSD) method, or a focused ion beam (FIB) processing device can be used for processing the cross section. In this case, an observation image obtained by observing the cross section of the particle with an attached scanning ion microscope (SIM) can be also used for the determination.

(Constituent Elements)

The elements constituting the lithium-nickel composite oxide include at least lithium (Li) and nickel (Ni). The elements may include at least one element selected from the group consisting of Co, Mn, Al, V, Mg, Mo, Ca, Cr, Zr, Ti, Nb, Na, K, W, Fe, Zn, B, Si, P, and Ta as an optional element (M). In addition, the elements may include a small amount of an element other than the above-described element.

The mole number ratio (molar ratio) of the elements, other than oxygen, constituting the lithium-nickel composite oxide is represented as Li:Ni:M=a:b:c (provided that, $0.95 \leq a \leq 1.10$, $0.30 \leq b \leq 1.00$, $0 \leq c \leq 0.70$, and $b+c=1$). Hereinafter, the content ratio of each element will be described.

(Lithium)

In the above-described mole number ratio, the value of "a" indicating the mole number ratio of Li corresponds to the mole number ratio of Li to the elements Me other than lithium (that is, Ni and M) (ratio of Li/Me). In the above-described mole number ratio, the range of "a" is $0.95 \leq a \leq 1.10$. When the range of "a" is in the above-described range, the reaction resistance of the positive electrode is decreased to improve the output of the secondary battery. When the value of "a" is not in the above-described range, the reaction resistance is increased to decrease the output of the battery in some cases. Furthermore, the range of "a" may be $0.97 \leq a \leq 1.05$.

(Nickel)

In the above-described mole number ratio, the range of "b" indicating the mole number ratio of Ni is $0.30 \leq b \leq 1.00$. When the value of "b" is in the above-described range, a high battery capacity and a high cycle characteristic can be attained. From the viewpoint of further improving the battery capacity, the range of "b" may be 0.70 or more, for example, $0.70 \leq b < 0.95$. Even when b is 1.00, a high cycle characteristic can be attained.

(Element M)

In the above-described mole number ratio, the element (M) is at least one selected from the group consisting of Co, Mn, Al, V, Mg, Mo, Ca, Cr, Zr, Ti, Nb, Na, K, W, Fe, Zn, B, Si, P, and Ta. In the above-described mole number ratio, the range of "c" indicating the mole number ratio of the element M is $0.00 \leq c \leq 0.70$, preferably $0.02 \leq c \leq 0.50$, and more preferably $0.10 \leq c \leq 0.30$. The kind of the element (M) can be appropriately selected according to the battery characteristic required.

For example, at least Co may be included as the element M. When the above-described mole number ratio "c" includes the mole number ratio of Co represented by "$c_1$", the range of "$c_1$" is $0 < c_1 \leq 0.30$, preferably $0.02 \leq c_1 \leq 0.25$, and more preferably $0.05 \leq c_1 \leq 0.20$. When the value of "$c_1$" is in the above-described range, high thermal stability and a high output characteristic can be attained.

As the element M, at least Mn may be included. When the above-described mole number ratio "c" includes the mole number ratio of Mn represented by "$c_2$", the range of "$c_2$" is preferably $0 < c_2 \leq 0.30$, more preferably $0.02 \leq c_2 \leq 0.25$, and still more preferably $0.05 \leq c_2 \leq 0.20$. When the range of "$c_2$" is in the above-described range, the thermal stability can be improved.

As the element M, at least Al may be included. When the above-described mole number ratio "c" includes the mole number ratio of Al represented by "$c_3$", the range of "$c_3$" is preferably $0<c_3\le0.10$, more preferably $0.01\le c_3\le0.08$, and still more preferably $0.01\le c_3\le0.06$. When the range of "$c_3$" is in the above-described range, the thermal stability can be improved.

Note that, the composition of the lithium-nickel composite oxide can be measured by quantitative analysis using inductive coupled plasma (ICP) emission spectrometry.

[Peak Intensity Ratio Between (003) Plane and (104) Plane]

The lithium-nickel composite oxide contained in the positive electrode active material according to the present embodiment has a hexagonal layered structure, and therefore when the positive electrode active material is measured with a powder X-ray diffraction method (hereinafter, also referred to as "XRD"), the obtained X-ray diffraction pattern has diffraction peaks attributed to the (003) plane and the (104) plane.

In the positive electrode active material according to the present embodiment, the X-ray diffraction pattern measured using a flat plate sample holder of a Bragg Brentano optical system has diffraction peak intensities attributed to the (003) plane and the (104) plane (hereinafter, also referred to as "$I_{(003)}$" and "$I_{(104)}$", respectively) corresponding to the height of the diffraction peaks, and the ratio of $I_{(003)}$ to $I_{(104)}$, that is, the value of $I_{(003)}/I_{(104)}$ is 2.0 or more, and more preferably 2.2 or more. When the value of $I_{(003)}/I_{(104)}$ measured using a flat plate sample holder is in the above-described range, the crystal structure is less disturbed, and the filling property of the positive electrode active material is improved, and as a result, the cycle characteristic is improved.

The diffraction peak intensity is affected not only by the crystal growth in the direction perpendicular to the target plane but also by the orientation of the sample filled in the sample holder. In particular when a flat plate sample holder is used for measurement, it is considered that the diffraction peak intensity is likely to be affected by the preferred orientation depending on the shape (crystal outer shape) of the sample filled into the flat plate sample holder. Here, the filling property of the particles of the lithium-nickel composite oxide in the flat plate sample holder is positively correlated with the filling property in the electrode (positive electrode) formed by applying the particles to a flat current collector, and an enhanced filling property of the sample in the flat plate sample holder is considered to indicate that the positive electrode active material can be highly filled into the positive electrode. Therefore, the value of $I_{(003)}/I_{(104)}$ measured using a flat plate sample holder serves as an index of not only the ratio of the crystal growth in the direction perpendicular to the (003) plane to the crystal growth in the direction perpendicular to the (104) plane, but also the filling property including the filling property at the time of forming the positive electrode. Therefore, when the value of $I_{(003)}/I_{(104)}$ measured using a flat plate sample holder is less than 2.0, the filling property deteriorates, and no effect of improving the cycle characteristic may be recognized.

The diffraction peak can be obtained from an X-ray diffraction pattern measured using an XRD diffractometer (for example, Empyrean manufactured by Malvern Panalytical Ltd.) with a CuKα ray.

[Degree of Circularity]

The positive electrode active material according to the present embodiment has a high degree of circularity. The degree of circularity is one of indices indicating the shape of a particle. A higher degree of circularity indicates that the particle has a shape closer to a sphere, and the upper limit of the degree of circularity is the degree of circularity of a spherical particle, 1.00. The degree of circularity of the positive electrode active material can be calculated using a flow type particle image analyzer. A small amount of a sample (positive electrode active material) is added to an aqueous or non-aqueous solution to obtain a suspension, and the suspension is introduced into the analyzer, and thus this analyzer can perform continuous imaging and image analysis of a plurality of particles in the suspension. From the projected area and the circumferential length of each imaged particle (of 3,000 or more), the degree of circularity of each particle is calculated using the following formula, and the average value of the obtained circularities is determined, and thus the degree of circularity of the positive electrode active material is calculated.

$$E=4\pi S/L^2 \tag{Formula}$$

In the above-described formula, E represents the degree of circularity, S represents the projected area of a particle, L represents the circumferential length of the particle, and n represents the circular constant.

The particles included in the positive electrode active material according to the present embodiment have a high degree of circularity even if the particles have a relatively large particle size, and the whole particles have a relatively high degree of circularity. It is presumed that the fact that the particles having a large particle size have a relatively high degree of circularity contributes to the high orientation in the XRD measurement. Specifically, the degree of circularity of the positive electrode active material is preferably 0.93 or more, preferably 0.94 or more, and more preferably 0.95 or more. The upper limit of the degree of circularity of the positive electrode active material is not particularly limited. The upper limit is 1.00 or less, and may be, for example, less than 1.00.

[Median Diameter (D50)]

The positive electrode active material according to the present embodiment has a volume-based median diameter (D50) of 10.0 μm or less, preferably 0.3 μm or more and 10.0 μm or less, preferably 1.0 μm or more and 10.0 μm or less, more preferably 1.2 μm or more and 8.0 μm or less, and still more preferably 1.5 μm or more and 8.0 μm or less. Note that, the median diameter (D50) can be determined from, for example, a volume integrated value measured with a laser light diffraction scattering type particle size distribution analyzer.

[Average Primary Particle Size]

The Lithium-nickel composite oxide has an average primary particle size of 0.3 μm or more, and may have an average primary particle size of 1.0 μm or more. The upper limit of the average primary particle size is equal to or smaller than the median diameter (D50). By setting the median diameter (D50) in the above-described range and setting the average particle size of the primary particles in the above-described range, a positive electrode active material can be obtained in which primary particles are sufficiently large and crystal grain boundaries are reduced. The average primary particle size is determined as follows. An SEM observation image of particles (outer shapes) of the lithium-nickel composite oxide is analyzed to measure the major axis lengths of five or more primary particles having an observable whole image, and the average value of the major axis lengths is calculated to determine the average primary particle size.

[Specific Surface Area]

The positive electrode active material according to the present embodiment preferably has a specific surface area of 1.0 m$^2$/g or more and 5.0 m$^2$/g or less as measured with a BET method. When the specific surface area is less than 1.0 m$^2$/g, the reaction sites for intercalation and deintercalation of lithium ions are decreased, and thus the charge capacity and the discharge capacity may deteriorate. The upper limit of the specific surface area is not particularly limited, and in the positive electrode active material according to the present embodiment, the upper limit is about 5.0 m$^2$/g.

[Eluted Lithium Amount]

The amount of lithium eluted in water when the positive electrode active material is immersed in water (hereinafter, also referred to as "eluted lithium amount") may be, for example, 0.8 mass % or less, and may be 0.5 mass % or less with respect to the whole positive electrode active material. The eluted lithium amount is more preferably 0.30 mass % or less, and still more preferably 0.15 mass % or less from the viewpoint of suppressing gas generation. By setting the eluted lithium amount in the above-described range, the cycle characteristic is improved as described above, and in addition, gas generation can be suppressed in the secondary battery. The range including the lower limit of the eluted lithium amount is not particularly limited. For example, even when the lower limit is 0.05 mass % or more, gas generation can be sufficiently suppressed. The eluted lithium amount can be reduced, for example, by containing Zr as the element (M) or by water washing described below.

2. Method for Producing Positive Electrode Active Material for Lithium Ion Secondary Battery The method for producing the positive electrode active material for a lithium ion secondary battery is not particularly limited as long as a positive electrode active material having the above-described characteristics can be obtained. Hereinafter, an example of the method for producing the positive electrode active material according to the present embodiment will be described.

The method for producing the positive electrode active material according to the present embodiment may include, for example, a mixing process (S10) of mixing a nickel composite compound and a lithium compound to obtain a mixture and a firing process (S20) of firing the mixture to obtain a lithium-nickel composite oxide.

In the mixing process (S10), the element (M) other than nickel may be added as a compound of the element (M), or a nickel composite compound containing the element (M) may be used.

[Mixing Process (S10)]

The mixing process (S10) is a process of mixing a nickel composite compound and a lithium compound to obtain a mixture. Furthermore, as necessary, a compound of the element (M) is also mixed. The lithium composite compound, the lithium compound, and as necessary the compound of the element (M) can be added, for example, as powder (solid phase) and mixed. Hereinafter, each material will be described.

(Nickel Composite Compound)

The nickel composite compound to be used in the mixing process (S10) can be obtained with a known method. The contents (compositions) of the metals (Ni and the element (M) that is, for example, Co) in the nickel composite compound are almost maintained also in the lithium-nickel composite oxide particles. Therefore, the content of each element is preferably in the same range as the content in the lithium-nickel composite oxide described above. The nickel composite compound to be used in the present embodiment may contain a small amount of an element, other than the above-described elements (Ni and the element (M) that is, for example, Co), hydrogen, and oxygen, in the range such that an effect of the present invention is not impaired.

The nickel composite compound may be a hydroxide or an oxide. Examples of the method for producing a nickel composite hydroxide include a method of performing neutralization crystallization using a metal salt aqueous solution and an alkaline solution. Furthermore, the nickel composite compound may be subjected to a heat treatment to remove moisture in the nickel composite compound, or a part or whole of the nickel composite compound may be converted into a nickel composite oxide.

(Lithium Compound)

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature. Lithium hydroxide is more preferable from the viewpoint of obtaining a lithium-nickel composite oxide having high crystallinity.

(Mixing Method)

The method for mixing the nickel composite compound, the lithium compound, and as necessary, the compound of the element (M) is not particularly limited, and these particles are to be sufficiently mixed to the extent such that the skeletons of these particles are not destroyed. In the mixing method, for example, mixing can be performed using a general mixer, and for example, mixing can be performed using a shaker mixer, a Loedige mixer, a Julia mixer, a V blender, or the like. When mixing is not sufficiently performed, the atomic percentage ratio of Li to the element Me other than Li (Li/Me) may vary among particles of the positive electrode active material and problems may arise that sufficient battery characteristics are not attained.

The lithium compound is mixed so that Li/Me in the mixture is 0.95 or more and 1.10 or less. In other words, the lithium compound is mixed so that Li/Me in the mixture is the same as Li/Me in the fired product obtained. This is because Li/Me in the mixture in this mixing process (S10) becomes Li/Me in the fired product since Li/Me and the molar ratio of each element do not change before and after the firing process (S20). The content (ratio) of each element in the mixture is almost maintained even in the lithium-nickel composite oxide. When water washing described below is performed, Li/Me in the mixture may be adjusted to be higher than the above-described range in consideration of the amount of excessive lithium to be removed.

[Firing Process (S20)]

The firing process (S20) is a process of firing the mixture obtained by the mixing process (S10) to obtain a fired product of the lithium-nickel composite oxide. When the mixture is fired, lithium in the lithium compound is diffused in the nickel composite compound, and thus a fired product of the lithium-nickel composite oxide is formed. The lithium compound melts at a temperature when firing and penetrates into the nickel composite compound to form a fired product of the lithium-nickel composite oxide.

The firing atmosphere is preferably an oxidizing atmosphere, and the oxygen concentration may be 80 vol % or more and is preferably 85 vol % or more. The retention temperature in the firing is preferably 700° C. or more and 1,000° C. or less. When firing is performed at the above-described temperature, the crystallinity of the lithium-nickel composite oxide is increased, and thus a battery capacity can be further improved.

The retention time at the firing temperature is set to preferably 3 hours or more, and more preferably 5 hours or more and 24 hours or less.

In the firing process (S20), the temperature may be retained at one stage to perform firing, but is preferably retained at two or more stages to perform firing. For example, when firing is performed at two stages of temperatures, it is preferable to include a first firing process (S21) of retaining the temperature to 600° C. or more and 800° C. or less for 30 minutes or more and a second firing process (S22) of retaining the temperature to a temperature equal to or more than the temperature in the first firing process and 1,000° C. or less.

When the two-stage firing process is performed, the lithium compound can be melted and sufficiently diffused into the nickel composite compound to react the lithium with the nickel composite compound in the first firing process, and in the second firing process, crystal growth can be promoted.

The upper limit of the retention time at the firing temperature in the first firing process is not particularly limited as long as lithium can be sufficiently diffused, and can be, for example, about 5 hours or less. The retention time at the firing temperature in the second firing process is not particularly limited as long as sufficient crystal growth occurs, and can be, for example, 3 hours or more and is preferably 5 hours or more and 24 hours or less.

[Crushing]

In the fired product of the lithium-nickel composite oxide obtained after the firing process (S20), sintering between particles is suppressed, but coarse particles may be formed by weak sintering and aggregation. Such coarse particles may be crushed. Crushing can eliminate the sintering and the aggregation to adjust the particle size distribution of the lithium-nickel composite oxide to be obtained. For crushing, a crusher is used such as a jet mill, a ball mill, or a wet ball mill.

[Water Washing]

The fired product of the lithium-nickel composite oxide obtained after the firing process (S20) may be washed with water as necessary. The water washing can remove excessive lithium remaining on the particle surface. When excessive lithium is removed by water washing, Li/Me in the lithium-nickel composite oxide may be controlled to the range of 0.95 or more and 1.10 or less.

3. Lithium Ion Secondary Battery

The method for producing a lithium ion secondary battery according to the present embodiment (hereinafter, also referred to as "method for producing a secondary battery") includes using a positive electrode, a negative electrode, and a non-aqueous electrolyte to obtain a lithium ion secondary battery, and the positive electrode is obtained using the positive electrode active material obtained by the aforementioned production method. Note that, the secondary battery obtained by the production method according to the present embodiment may include, for example, a positive electrode, a negative electrode, a separator, and a non-aqueous electrolyte solution or may include a positive electrode, a negative electrode, and a solid electrolyte. Furthermore, the secondary battery may include components similar to those of a known lithium ion secondary battery.

Hereinafter, as an example of the method for producing a secondary battery according to the present embodiment, each constituent material of the secondary battery using a non-aqueous electrolyte solution and the method for producing the secondary battery will be described. Note that, an embodiment described below is merely an example, and the method for producing a secondary battery can be implemented in various modified forms or improved forms on the basis of knowledge of those skilled in the art on the basis of the embodiment described here. Furthermore, use of the secondary battery obtained by the production method according to the present embodiment is not particularly limited.

(Positive Electrode)

The positive electrode contains the positive electrode active material described above. The positive electrode can be produced, for example, as follows. Note that, the method for fabricating the positive electrode is not limited to the following example, and other methods may be adopted.

First, the positive electrode active material, a conductive material, and a binder (binding agent) are mixed together, activated carbon and a solvent for viscosity adjustment or the like are further added thereto if necessary, and this mixture is kneaded to fabricate a positive electrode mixture paste. Note that, the constituent materials of the positive electrode mixture paste are not particularly limited, and materials equivalent to those of a known positive electrode mixture paste may be used.

The mixing ratio of each material in the positive electrode mixture paste is not particularly limited and is appropriately adjusted according to the required performance of the secondary battery. The mixing ratio of the materials can be in a range similar to that in a known positive electrode mixture paste for secondary batteries. For example, when the total mass of solids in the positive electrode mixture excluding the solvent is 100 parts by mass, the content of the positive electrode active material may be 60 parts by mass or more and 95 parts by mass or less, the content of the conductive material may be 1 part by mass or more and 20 parts by mass or less, and the content of the binder may be 1 part by mass or more and 20 parts by mass or less.

Examples of the conductive material that can be used include graphite (such as natural graphite, artificial graphite, and expanded graphite) and carbon black-based materials such as acetylene black and ketjen black.

The binder (binding agent) plays a role of bonding active material particles together, and examples of the binder (binding agent) that can be used include polyvinylidene fluoride (PVDF), polytetrafluoroethylene (PTFE), fluorine-containing rubber, ethylene propylene diene rubber, styrene butadiene, a cellulose-based resin, and polyacrylic acid.

Note that, if necessary, a solvent that disperses the positive electrode active material, the conductive material, and activated carbon and dissolves the binder (binding agent) may be added to the positive electrode mixture paste. As the solvent, specifically, an organic solvent such as N-methyl-2-pyrrolidone (NMP) may be used. Furthermore, activated carbon may be added to the positive electrode mixture in order to increase electric double layer capacity.

Next, the obtained positive electrode mixture paste is applied to, for example, the surface of an aluminum foil current collector and dried to scatter the solvent, thereby fabricating a sheet-shaped positive electrode. Pressurization may be performed by roll press or the like in order to increase electrode density if necessary. The sheet-shaped positive electrode can be, for example, cut into an appropriate size depending on the intended battery, and used for fabricating a battery.

(Negative Electrode)

As the negative electrode, metal lithium, a lithium alloy, and the like may be used. Furthermore, as the negative electrode, a negative electrode may be used that is formed by mixing a binding agent with a negative electrode active material capable of inserting and de-inserting lithium ions, adding an appropriate solvent thereto to form a paste-like negative electrode mixture, coating the surface of a metal foil current collector such as copper with the paste-like negative electrode mixture, drying the coated metal foil current collector, and compressing the resultant metal foil current collector in order to increase the electrode density as necessary.

As the negative electrode active material, for example, natural graphite, artificial graphite, a fired body of an organic compound such as a phenol resin, and a powdery body of a carbon substance such as coke can be used. As the negative electrode binding agent, a fluorine-containing resin such as PVDF can be used in the same manner as in the positive electrode. Furthermore, an organic solvent such as N-methyl-2-pyrrolidone can be used as a solvent to disperse these active material and binding agent.

(Separator)

A separator is disposed so as to be interposed between the positive electrode and the negative electrode. The separator separates the positive electrode and the negative electrode from each other and retains the electrolyte, and as the separator, a thin film of polyethylene, polypropylene, or the like having a large number of minute holes can be used.

(Non-Aqueous Electrolyte)

As the non-aqueous electrolyte, for example, a non-aqueous electrolyte solution can be used.

As the non-aqueous electrolyte solution, for example, a solution obtained by dissolving a lithium salt as a supporting salt in an organic solvent can be used. Furthermore, as the non-aqueous electrolyte solution, a solution obtained by dissolving a lithium salt in an ionic liquid may be used. Note that, the ionic liquid refers to a salt including a cation other than a lithium ion and including an anion, and being in a liquid state even at room temperature.

As the organic solvent, one selected from a cyclic carbonate such as ethylene carbonate, propylene carbonate, butylene carbonate, or trifluoropropylene carbonate, a chain carbonate such as diethyl carbonate, dimethyl carbonate, ethyl methyl carbonate, or dipropyl carbonate, an ether compound such as tetrahydrofuran, 2-methyltetrahydrofuran, or dimethoxyethane, a sulfur compound such as ethylmethylsulfone or butanesultone, a phosphorus compound such as triethyl phosphate or trioctyl phosphate, and the like may be used singly, or two or more selected from the above-described compounds can also be mixed to be used.

As the supporting salt, $LiPF_6$, $LiBF_4$, $LiClO_4$, $LiAsF_6$, $LiN(CF_3SO_2)_2$, a composite salt thereof, and the like can be used. Furthermore, the non-aqueous electrolyte solution may contain a radical scavenger, a surfactant, a flame retardant, and the like.

As the non-aqueous electrolyte, a solid electrolyte may also be used. The solid electrolyte has a property of withstanding a high voltage. Examples of the solid electrolyte include inorganic solid electrolytes and organic solid electrolytes.

Examples of the inorganic solid electrolytes include oxide-based solid electrolytes and sulfide solid electrolytes.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like can be used.

Note that, as the inorganic solid electrolyte, ones other than the above-described inorganic solid electrolytes may be used, and for example, $Li_3N$, $LiI$, $Li_3N$—$LiI$—$LiOH$, and the like may be used.

The organic solid electrolyte is not particularly limited as long as it is a polymer compound that exhibits ionic conductivity, and for example, polyethylene oxide, polypropylene oxide, and copolymers of these can be used. Furthermore, the organic solid electrolyte may contain a supporting salt (lithium salt).

(Shape and Configuration of Battery)

The lithium ion secondary battery according to the present embodiment including the positive electrode, the negative electrode, and the non-aqueous electrolyte described above can have various shapes such as a cylindrical shape and a laminated shape. Even when the secondary battery has any shape, the positive electrode and the negative electrode are stacked with the separator interposed therebetween to form an electrode body, the obtained electrode body is impregnated with the non-aqueous electrolyte solution, a positive electrode collector is connected to a positive electrode terminal communicating with the outside using a current collecting lead or the like, a negative electrode collector is connected to a negative electrode terminal communicating with the outside using a current collecting lead or the like, and the resulting product is sealed in a battery case to complete the lithium ion secondary battery. Note that, when a solid electrolyte is used, the solid electrolyte may also serve as a separator.

(Characteristics)

Figure 3:
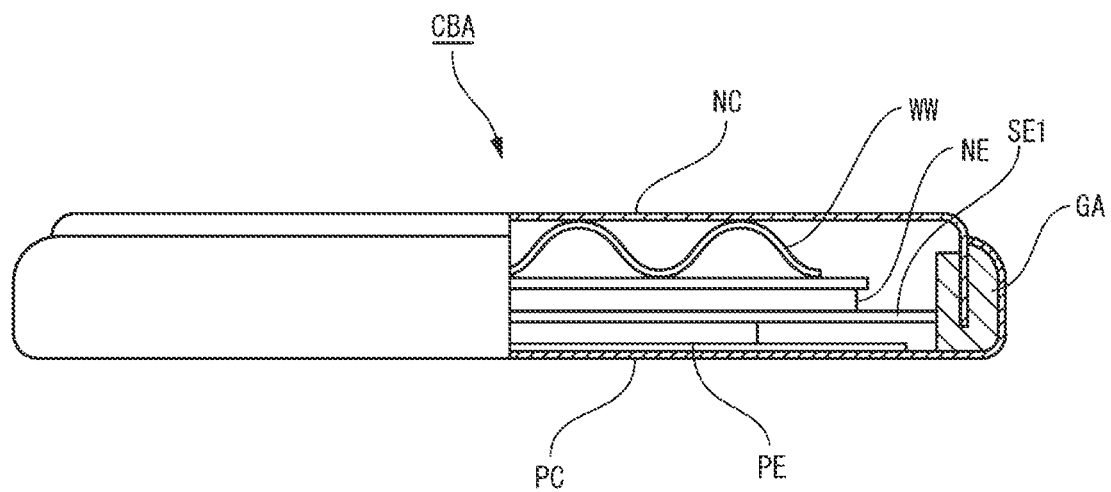
FIG. 3 is a schematic explanatory view of a coin-type battery used for battery evaluation.

A secondary battery produced using the above-described positive electrode active material as a positive electrode can have a high battery capacity. When a positive electrode active material obtained in a preferable embodiment is used in, for example, a positive electrode of a 2032 coin-type battery CBA as shown in FIG. 3 described below, a high initial discharge capacity of 185 mAh/g or more, or in some production conditions, 190 mAh/g or more or 200 mAh/g or more can be obtained in the charge and discharge voltage range of 2.5 V or more and 4.3 V or less. This coin-type battery CBA can have an initial charge and discharge efficiency (efficiency) of 85% or more.

Figure 4:
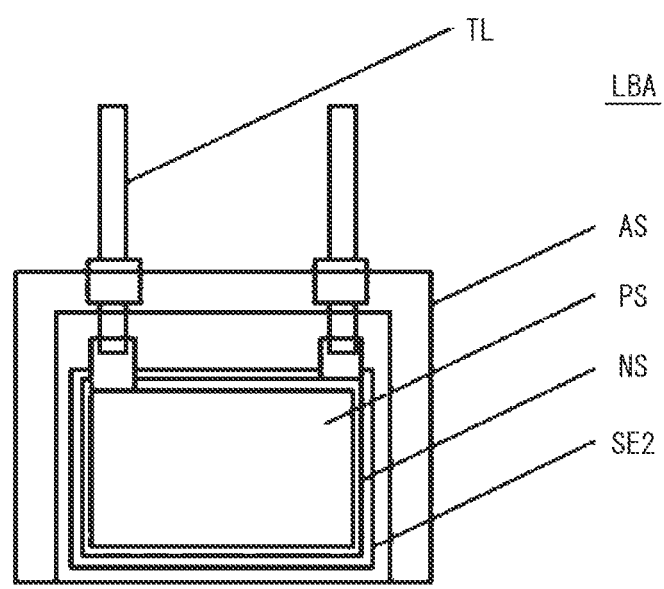
FIG. 4 is a schematic explanatory view of a laminate-type battery used for battery evaluation.

A secondary battery produced using the above-described positive electrode active material as a positive electrode can also have a high cycle characteristic. When a positive electrode active material obtained in a preferable embodiment is used in, for example, a positive electrode of a laminate-type battery LBA as shown in FIG. 4, the capacity retention rate after 500 cycles can be 60% or more, preferably 70% or more, more preferably 75% or more, and still more preferably 80% or more.

EXAMPLES

Hereinafter, the present invention will be described in more detail with reference to Examples and Comparative Examples of the present invention, but the present invention is not limited to these Examples at all. Note that, methods for analyzing metals contained in positive electrode active materials and various methods for evaluating the positive electrode active materials in Examples and Comparative Examples are as follows.

(1) Analysis of Composition: Measurement was Performed by ICP Emission Spectrometry.

(2) Number Proportion of Single Primary Particles

The lithium-nickel composite oxide particles were embedded in a thermosetting resin, and then polished with a cross section polisher (SM-09010 manufactured by JEOL Ltd.). The obtained particle cross sections were observed using a Schottky field emission scanning electron microscope (Ultra 55 manufactured by Carl Zeiss Co., Ltd.), and the number proportion of single primary particles to 100 or more particles was evaluated.

(3) Average Primary Particle Size

An SEM observation image of particles (outer shapes) of the lithium-nickel composite oxide was analyzed to measure the major axis lengths of five or more primary particles having an observable whole image, and the average value of the major axis lengths was calculated to determine the average primary particle size.

(4) Median Diameter (D50)

Measurement was performed on a volume basis by a laser diffraction/scattering particle size distribution analyzer (Microtrac HRA manufactured by NIKKISO CO., LTD.).

(5) Specific Surface Area

Measurement was performed by a BET method based on nitrogen adsorption using a specific surface area/pore distribution measuring apparatus (Macsorb HM1200 Series manufactured by Mountech Co., Ltd.).

(6) Eluted Lithium Amount

In 100 ml of pure water at 25° C., 20 g of the positive electrode active material prepared was put and immersed, the resulting solution was stirred for 30 minutes and then left to stand still for 10 minutes to obtain a supernatant liquid, and the supernatant liquid was titrated using an HCl aqueous solution. The titration was evaluated with the Warder method. The amounts of lithium hydroxide (LiOH) and lithium carbonate ($Li_2CO_3$) were calculated, and the sum of the lithium amounts included in the obtained amounts was calculated as the eluted lithium amount.

(7) Intensities of (003) Plane Peak and (104) Plane Peak

The peak intensities, which correspond to the height of the diffraction peaks, of the (003) plane [$I_{(003)}$] and the (104) plane [$I_{(104)}$] in the hexagonal layered structure were calculated from the X-ray diffraction pattern measured using an XRD diffractometer (Empyrean manufactured by Malvern Panalytical Ltd.) with a CuKα ray. The sample was filled into the groove portion of a circular glass holder having an outer diameter of 32 mmφ (flat plate sample holder, groove portion inner diameter: 24 mmφ, groove depth: 0.5 mm, product number: 9200 540 12391, manufactured by Malvern Panalytical Ltd.), fixed to a predetermined sample holder (product number: 9430 018 13321, manufactured by Malvern Panalytical Ltd.), and measured.

(8) Degree of Circularity

The Degree of circularity was determined using a flow type particle image analyzer (FPIA-3000 manufactured by SYSMEX CORPORATION).

(9) Evaluation of Charge Capacity, Discharge Capacity, and Efficiency (Battery Characteristics)

[Fabrication of Coin-Type Battery]

As illustrated in FIG. 3, the coin-type battery CBA includes a case CA and an electrode housed in the case CA.

The case CA includes a positive electrode can PC that is hollow and has one end opened, and a negative electrode can NC disposed in an opening of the positive electrode can PC. When the negative electrode can NC is disposed in the opening of the positive electrode can PC, a space to house the electrode is formed between the negative electrode can NC and the positive electrode can PC.

The electrode includes a positive electrode PE, a separator SE1, and a negative electrode NE stacked in this order, and is housed in the case CA so that the positive electrode PE is in contact with an inner surface of the positive electrode can PC and the negative electrode NE is in contact with an inner surface of the negative electrode can NC.

Note that the case CA includes a gasket GA, and the gasket GA regulates relative movement of the positive electrode can PC and the negative electrode can NC and fixes the electrodes so as to maintain a state in which the positive electrode can PC and the negative electrode can NC are not in contact with each other, that is, a state of electrical insulation. In addition, the gasket GA also has a function of sealing a gap between the positive electrode can PC and the negative electrode can NC to shut off a passage between the inside of the case CA and the outside thereof in an airtight and liquid tight manner.

This coin-type battery CBA was fabricated as follows. First, 52.5 mg of the obtained positive electrode active material, 15 mg of acetylene black, and 7.5 mg of a polytetrafluoroethylene (PTFE) resin were mixed, and the mixture was formed into a thin film having a diameter of 11 mm and a weight of about 75 mg to fabricate a positive electrode PE, and the positive electrode PE was dried in a vacuum dryer at 100° C. for 12 hours.

The positive electrode PE, a negative electrode NE, a separator SE1, and an electrolyte solution were used in a glove box having an Ar atmosphere controlled at a dew point of −60° C. to fabricate a coin-type battery CBA.

As the negative electrode NE, a lithium metal punched into a disk shape having a diameter of 13 mm was used.

As the separator SE1, a polyethylene porous film having a thickness of 25 μm was used. As the electrolyte solution, a mixed solution containing 1 M $LiClO_4$ as a supporting electrolyte and containing ethylene carbonate (EC) and diethyl carbonate (DEC) at a volume-based mixing ratio of 1:1 (manufactured by Tomiyama Pure Chemical Industries, Ltd.) was used.

[Evaluation of Charge Capacity, Discharge Capacity, and Efficiency]

The coin-type battery CBA fabricated was left to stand for about 12 hours, and after the open circuit voltage (OCV) stabilized, the coin-type battery CBA was charged to a cutoff voltage of 4.3 V with a current density of 0.1 mA/cm² for the positive electrode, and the capacity obtained at this time was defined as the charge capacity. After a rest time of 1 hour, the charged coin-type battery CBA was discharged to a cutoff voltage of 2.5 V, and the capacity obtained at this time was defined as the discharge capacity. Then, efficiency, which is the ratio of the discharge capacity to the charge capacity, was calculated.

(10) Cycle Characteristic and Amount of Gas Generated
[Fabrication of Laminate-Type Battery]

As illustrated in FIG. 2, the laminate-type battery LBA has a structure in which a laminate including a positive electrode film PS, a separator SE2, and a negative electrode film NS and impregnated with an electrolyte solution is sealed by a laminate LE. A positive electrode tab TL is connected to the positive electrode film PS, and a negative electrode tab NT is connected to the negative electrode film NS, and the positive electrode tab PT and the negative electrode tab NT are exposed to the outside of the laminate LA.

A slurry in which 20.0 g of the obtained positive electrode active material, 2.35 g of acetylene black, and 1.18 g of polyvinylidene fluoride were dispersed in N-methyl-2-pyrrolidone (NMP) was applied to an Al foil so that the positive electrode active material was present in an amount of 7.0 mg per square centimeter. Then, the resulting product in which the slurry containing the positive electrode active material was applied to the Al foil was dried in the air at 120° C. for 30 minutes to remove NMP. The Al foil to which the positive electrode active material was applied was cut into a strip shape with a width of 66 mm, and the resulting product was roll-pressed with a load of 1.2 t to fabricate a positive electrode film. Then, the positive electrode film was cut into a rectangle of 50 mm×30 mm, and the resulting product was dried in a vacuum dryer at 120° C. for 12 hours and used as the positive electrode film PS of the laminate-type battery LBA.

Furthermore, the negative electrode film NS was prepared by applying a negative electrode mixture paste that is a mixture of a graphite powder having an average particle size of about 20 μm and polyvinylidene fluoride to a copper foil. As the separator SE2, a polyethylene porous film having a thickness of 20 μm was used. As the electrolyte solution, a mixed solution containing 1 M $LiPF_6$ as a supporting electrolyte and containing ethylene carbonate (EC) and diethyl carbonate (DEC) at a ratio of 3:7 (manufactured by Ube Industries, Ltd.) was used.

In a dry room controlled at a dew point of −60° C., a laminate of the positive electrode film PS, the separator SE2, and the negative electrode film NS was impregnated with an electrolyte solution and sealed by the laminate LA, and thus the laminate-type battery LBA was fabricated.

[Cycle Characteristic]

The capacity retention rate after 500 cycles of charge and discharge was measured to evaluate the cycle characteristic. Specifically, conditioning of the laminate-type battery LBA was performed as follows. In one cycle, the laminate-type battery LBA was charged to a cutoff voltage of 4.2 V with a current density of 0.3 mA/cm$^2$ in a thermostatic chamber maintained at 25° C., and after a rest time of 10 minutes, discharged to a cutoff voltage of 2.5 V. This cycle was repeated 5 times in the conditioning. After the conditioning, a cycle in which the laminate-type battery LBA was charged to a cutoff voltage of 4.2 V with a current density of 2.0 mA/cm$^2$ in a thermostatic chamber maintained at 45° C., and after a rest time of 10 minutes, discharged to a cutoff voltage of 2.5 V was repeated 500 times. The ratio of the discharge capacity obtained through 500 cycles to the discharge capacity obtained through 1 cycle after the conditioning was calculated as the capacity retention rate, and evaluated. In Example 11 and Comparative Example 8, the cutoff voltage for the charge was set to 4.3 V.

Example 1

A nickel composite oxide obtained using a known method in which the mole number ratio of nickel, manganese, and cobalt was Ni:Mn:Co=85.0:10.0:5.0 (D50 particle size: 13.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.015 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 700° C. and retained for 3 hours in an oxygen-containing atmosphere having an oxygen concentration of 90 vol % and the balance being nitrogen, and subsequently heated to 850° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles for the most part and a small number of secondary particles at a number proportion of the single primary particles of 81.5%. FIG. 1 shows the SEM observation image of the particle cross section. The positive electrode active material had an average primary particle size of 2.3 μm, and a D50 of 2.6 μm. Tables 1 and 2 show the evaluation results.

Example 2

A nickel composite oxide obtained using a known method in which the mole number ratio of nickel and cobalt was Ni:Co=95.0:5.0 (D50 particle size: 5.8 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was crushed with a jet mill to obtain a positive electrode active material including the lithium-nickel composite oxide particles. It was confirmed that Li/Me in the obtained positive electrode active material was 0.999.

The obtained positive electrode active material was observed with an SEM, and as a result, it was confirmed that the lithium-nickel composite oxide particles included a large number of single primary particles for the most part and a small number of secondary particles at a number proportion of the single primary particles of 92.1%. The positive electrode active material had an average primary particle size of 1.3 μm, and a D50 of 1.4 μm. Tables 1 and 2 show the evaluation results.

Example 3

A nickel composite oxide obtained using a known method in which the mole number ratio of nickel and cobalt was Ni:Co=95.0:5.0 (D50 particle size: 5.8 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles and a small number of secondary particles at a number proportion of the single primary particles of 75.6%. The positive electrode active material had an average primary particle size of 1.5 μm, and a D50 of 1.5 μm. Tables 1 and 2 show the evaluation results.

Example 4

A nickel composite oxide obtained using a known method in which the mole number ratio of nickel and manganese was Ni:Mn=95.0:5.0 (D50 particle size: 6.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.025 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 800° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles for the most part and a small number of secondary particles at a number proportion of the single primary particles of 83.6%. The positive electrode active material had an average primary particle size of 1.6 μm, and a D50 of 2.1 μm. Tables 1 and 2 show the evaluation results.

Comparative Example 1

A nickel composite oxide obtained using a known method in which the mole number ratio of nickel, manganese, and cobalt was Ni:Mn:Co=85.0:10.0:5.0 (D50 particle size: 13.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.015 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 700° C. and retained for 3 hours in an oxygen-containing atmosphere having an oxygen concentration of 90 vol % and the balance being nitrogen, and subsequently heated to 850° C. and retained for 8 hours to perform firing.

The lithium-nickel composite oxide after firing was treated with a hammer mill to obtain a positive electrode active material including the lithium-nickel composite oxide particles.

The obtained positive electrode active material was observed with an SEM, and as a result, it was confirmed that the lithium-nickel composite oxide particles included almost only secondary particles at a number proportion of the single primary particles of 5.6%. The positive electrode active material had an average primary particle size of 2.5 μm, and a D50 of 15.8 μm. Tables 1 and 2 show the evaluation results.

Comparative Example 2

A nickel composite oxide obtained using a known method in which the mole number ratio of nickel and cobalt was Ni:Co=95.0:5.0 (D50 particle size: 5.8 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was treated with a hammer mill to obtain a positive electrode active material including the lithium-nickel composite oxide particles.

The obtained positive electrode active material was observed with an SEM, and as a result, it was confirmed that the lithium-nickel composite oxide particles included almost only secondary particles at a number proportion of the single primary particles of 0.2%. The positive electrode active material had an average primary particle size of 1.7 μm, and a D50 of 7.7 μm. Tables 1 and 2 show the evaluation results.

Comparative Example 3

A nickel composite oxide obtained using a known method in which the mole number ratio of nickel and manganese was Ni:Mn=95.0:5.0 (D50 particle size: 6.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.025 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 800° C. and retained for 8 hours to perform firing.

The lithium-nickel composite oxide after firing was treated with a hammer mill to obtain a positive electrode active material including the lithium-nickel composite oxide particles.

The obtained positive electrode active material was observed with an SEM, and as a result, it was confirmed that the lithium-nickel composite oxide particles included almost only secondary particles at a number proportion of the single primary particles of 0.5%. The positive electrode active material had an average primary particle size of 2.5 μm, and a D50 of 15.8 μm. Tables 1 and 2 show the evaluation results.

TABLE 1

| | Positive electrode active material | | | | | | | |
|---|---|---|---|---|---|---|---|---|
| | Mole number ratio (molar ratio) | | | Number proportion of single primary particles (%) | D50 (μm) | Average primary particle size (μm) | Specific surface area (m$^2$/g) | $I_{(003)}/I_{(104)}$ | Degree of circularity |
| | Li(a) | Ni(b) | M(c) | | | | | | |
| Example 1 | 1.015 | 0.850 | Mn 0.100 Co 0.050 | 81.5 | 2.6 | 2.3 | 1.61 | 2.78 | 0.95 |
| Example 2 | 0.999 | 0.950 | Co 0.050 | 92.1 | 1.4 | 1.3 | 1.90 | 2.22 | 0.96 |
| Example 3 | 1.020 | 0.950 | Co 0.050 | 75.6 | 1.5 | 1.5 | 1.54 | 2.23 | 0.95 |
| Example 4 | 1.025 | 0.950 | Mn 0.050 | 83.6 | 2.1 | 1.6 | 1.33 | 2.42 | 0.94 |
| Comparative Example 1 | 1.015 | 0.850 | Mn 0.100 Co 0.050 | 5.6 | 15.8 | 2.5 | 0.24 | 1.82 | 0.92 |
| Comparative Example 3 | 0.999 | 0.950 | Co 0.050 | 0.2 | 7.7 | 1.7 | 0.72 | 1.56 | 0.92 |
| Comparative Example 3 | 1.025 | 0.950 | Mn 0.050 | 0.5 | 8.4 | 1.8 | 0.49 | 1.98 | 0.90 |

TABLE 2

| | Coin-type battery | | | Laminate-type battery | |
|---|---|---|---|---|---|
| | Charge capacity (mAh/g) | Discharge capacity (mAh/g) | Charge and discharge efficiency (%) | Discharge capacity (mAh/g) | Capacity retention rate (%) |
| Example 1 | 230.2 | 200.9 | 87.3 | 174.0 | 83.0 |
| Example 2 | 236.3 | 211.1 | 89.3 | 182.3 | 70.2 |
| Example 3 | 246.6 | 224.1 | 90.9 | 207.0 | 72.5 |

TABLE 2-continued

| | Coin-type battery | | | Laminate-type battery | |
|---|---|---|---|---|---|
| | Charge capacity (mAh/g) | Discharge capacity (mAh/g) | Charge and discharge efficiency (%) | Discharge capacity (mAh/g) | Capacity retention rate (%) |
| Example 4 | 243.0 | 212.0 | 87.2 | 180.0 | 65.0 |
| Comparative Example 1 | 234.6 | 201.6 | 85.9 | 172.0 | 61.0 |
| Comparative Example 2 | 240.1 | 211.5 | 88.1 | 181.2 | 60.6 |
| Comparative Example 3 | 244.9 | 212.3 | 86.7 | 181.0 | 48.0 |

Example 5

A nickel composite oxide obtained using a known method in which the mole number ratio of nickel, cobalt, and aluminum was Ni:Co:Al=95.0:3.0:2.0 (D50 particle size: 6.0 µm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was crushed with a jet mill to obtain a positive electrode active material including the lithium-nickel composite oxide particles. It was confirmed that Li/Me in the obtained positive electrode active material was 0.986.

The obtained positive electrode active material was observed with an SEM, and as a result, it was confirmed that the lithium-nickel composite oxide particles included a large number of single primary particles and a small number of secondary particles at a number proportion of the single primary particles of 71.4%. The positive electrode active material had an average primary particle size of 1.0 µm, and a D50 of 1.1 m. Tables 3 and 4 show the evaluation results.

Example 6

A nickel composite oxide obtained using a known method in which the mole number ratio of nickel, cobalt, and aluminum was Ni:Co:Al=95.0:3.0:2.0 (D50 particle size: 6.0 µm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles and included secondary particles at a number proportion of the single primary particles of 62.0%. The positive electrode active material had an average primary particle size of 1.0 µm, and a D50 of 1.2 µm. Tables 3 and 4 show the evaluation results.

Example 7

A nickel composite oxide obtained using a known method in which the mole number ratio of nickel, cobalt, and aluminum was Ni:Co:Al=82.0:15.0:3.0 (D50 particle size: 5.7 µm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.018 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 85 vol % and the balance being nitrogen, and subsequently heated to 810° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles and a small number of secondary particles at a number proportion of the single primary particles of 70.1%. The positive electrode active material had an average primary particle size of 1.9 µm, and a D50 of 2.1 µm. Tables 3 and 4 show the evaluation results.

Example 8

A nickel composite oxide obtained using a known method in which the mole number ratio of nickel and aluminum was Ni:Al=95.0:5.0 (D50 particle size: 6.2 µm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was crushed with a jet mill to obtain a positive electrode active material including the lithium-nickel composite oxide particles. It was confirmed that Li/Me in the obtained positive electrode active material was 0.976.

The obtained positive electrode active material was observed with an SEM, and as a result, it was confirmed that the lithium-nickel composite oxide particles included a large number of single primary particles for the most part and a small number of secondary particles at a number proportion of the single primary particles of 81.6%. The positive electrode active material had an average primary particle size of 0.8 μm, and a D50 of 0.9 μm. Tables 3 and 4 show the evaluation results.

Example 9

A nickel composite oxide obtained using a known method in which the mole number ratio of nickel and aluminum was Ni:Al=95.0:5.0 (D50 particle size: 5.8 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles and included secondary particles at a number proportion of the single primary particles of 56.8%. The positive electrode active material had an average primary particle size of 0.9 μm, and a D50 of 1.2 μm. Tables 3 and 4 show the evaluation results.

Example 10

Nickel oxide obtained using a known method (D50 particle size: 6.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.018 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 800° C. and retained for 8 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles for the most part and a small number of secondary particles at a number proportion of the single primary particles of 86.5%. FIG. 1 shows the SEM observation image of the cross section. The positive electrode active material had an average primary particle size of 2.1 μm, and a D50 of 2.2 μm. Tables 3 and 4 show the evaluation results. FIG. 2 shows an example of the GROD map of the particle cross section.

Comparative Example 4

A nickel composite oxide obtained using a known method in which the mole number ratio of nickel, cobalt, and aluminum was Ni:Co:Al=95.0:3.0:2.0 (D50 particle size: 6.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was treated with a hammer mill to obtain a positive electrode active material including the lithium-nickel composite oxide particles.

The obtained positive electrode active material was observed with an SEM, and as a result, it was confirmed that the lithium-nickel composite oxide particles included only secondary particles at a number proportion of the single primary particles of 0.0%. The positive electrode active material had an average primary particle size of 1.1 μm, and a D50 of 8.3 μm. Tables 3 and 4 show the evaluation results.

Comparative Example 5

A nickel composite oxide obtained using a known method in which the mole number ratio of nickel, cobalt, and aluminum was Ni:Co:Al=82.0:15.0:3.0 (D50 particle size: 5.7 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.018 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 85 vol % and the balance being nitrogen, and subsequently heated to 810° C. and retained for 8 hours to perform firing.

The lithium-nickel composite oxide after firing was treated with a hammer mill to obtain a positive electrode active material including the lithium-nickel composite oxide particles.

The obtained positive electrode active material was observed with an SEM, and as a result, it was confirmed that the lithium-nickel composite oxide particles included only secondary particles at a number proportion of the single primary particles of 0.0%. The positive electrode active material had an average primary particle size of 2.0 μm, and a D50 of 8.0 μm. Tables 3 and 4 show the production conditions and the evaluation results.

Comparative Example 6

A nickel composite oxide obtained using a known method in which the mole number ratio of nickel and aluminum was Ni:Al=95.0:5.0 (D50 particle size: 6.2 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.020 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 760° C. and retained for 8 hours to perform firing.

The lithium-nickel composite oxide after firing was put into a beaker containing pure water having a temperature of 25° C. so that the concentration of the lithium-nickel composite oxide was 1,500 g/L, and washed with water for 15 minutes. Then, the lithium-nickel composite oxide was filtered out as a moisture-containing powder, and the obtained moisture-containing powder was dried in vacuum at 190° C. for 15 hours. The lithium-nickel composite oxide after drying in vacuum was treated with a hammer mill to obtain a positive electrode active material including the lithium-nickel composite oxide particles.

The obtained positive electrode active material was observed with an SEM, and as a result, it was confirmed that the lithium-nickel composite oxide particles included only secondary particles at a number proportion of the single primary particles of 0.0%. The positive electrode active material had an average primary particle size of 0.8 μm, and a D50 of 6.8 μm. Tables 3 and 4 show the evaluation results.

Comparative Example 7

Nickel oxide obtained using a known method (D50 particle size: 6.0 μm) was sufficiently mixed with lithium hydroxide using a shaker mixer device (model: TURBULA Type T2 C manufactured by Willy A. Bachofen (WAB) AG) to prepare a raw material mixture. The raw materials were weighed so that Li/Me was 1.018 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 3 hours in an oxygen-containing atmosphere having an oxygen concentration of 90 vol % and the balance being nitrogen, and subsequently heated to 720° C. and retained for 8 hours to perform firing.

The lithium-nickel composite oxide after firing was treated with a hammer mill to obtain a positive electrode active material including the lithium-nickel composite oxide particles.

The obtained positive electrode active material was observed with an SEM, and as a result, it was confirmed that the lithium-nickel composite oxide particles included only secondary particles at a number proportion of the single primary particles of 0.0%. FIG. 2 shows the SEM observation image of the cross section. The positive electrode active material had an average primary particle size of 0.6 μm, and a D50 of 7.4 μm. Tables 3 and 4 show the evaluation results.

TABLE 3

| | Mole number ratio (molar ratio) | | | Positive electrode active material | | | | | |
|---|---|---|---|---|---|---|---|---|---|
| | Li(a) | Ni(b) | M(c) | Number proportion of single primary particles (%) | D50(μm) | Average primary particle size (μm) | Specific surface area (m²/g) | $I_{(003)}/I_{(104)}$ | Degree of circularity |
| Example 5 | 0.986 | 0.950 | Co 0.030 Al 0.020 | 71.4 | 1.1 | 1.0 | 2.10 | 2.16 | 0.95 |
| Example 6 | 1.020 | 0.950 | Co 0.030 Al 0.020 | 62.0 | 1.2 | 1.0 | 1.66 | 2.18 | 0.94 |
| Example 7 | 1.018 | 0.820 | Co 0.150 Al 0.030 | 70.1 | 2.1 | 1.9 | 1.37 | 2.25 | 0.96 |
| Example 8 | 0.976 | 0.950 | Al 0.050 | 81.6 | 0.9 | 0.8 | 2.56 | 2.20 | 0.96 |
| Example 9 | 1.020 | 0.950 | Al 0.050 | 56.8 | 1.2 | 0.9 | 2.00 | 2.23 | 0.95 |
| Example 10 | 1.018 | 1.000 | — | 86.5 | 2.2 | 2.1 | 1.15 | 2.61 | 0.95 |
| Comparative Example 4 | 0.988 | 0.950 | Co 0.030 Al 0.020 | 0.0 | 8.3 | 1.1 | 0.66 | 1.54 | 0.92 |
| Comparative Example 5 | 1.018 | 0.820 | Co 0.150 Al 0.030 | 0.0 | 8.0 | 2.0 | 0.47 | 1.92 | 0.92 |
| Comparative Example 6 | 0.978 | 0.950 | Al 0.050 | 0.0 | 6.8 | 0.8 | 1.07 | 1.75 | 0.92 |
| Comparative Example 7 | 1.018 | 1.000 | — | — | 0.0 | 7.4 | 0.6 | 0.85 | 1.69 | 0.91 |

TABLE 4

| | Coin-type battery | | | Laminate-type battery | |
|---|---|---|---|---|---|
| | Charge capacity (mAh/g) | Discharge capacity (mAh/g) | Charge and discharge efficiency (%) | Discharge capacity (mAh/g) | Capacity retention rate (%) |
| Example 5 | 244.7 | 223.1 | 91.2 | 183.0 | 80.0 |
| Example 6 | 241.3 | 221.2 | 91.7 | 204.8 | 76.4 |
| Example 7 | 218.5 | 202.5 | 92.7 | 192.3 | 79.2 |
| Example 8 | 230.1 | 205.8 | 89.4 | 198.5 | 71.6 |
| Example 9 | 236.4 | 210.2 | 88.9 | 199.2 | 70.5 |
| Example 10 | 241.0 | 203.2 | 84.3 | 177.8 | 63.9 |
| Comparative Example 4 | 246.4 | 215.6 | 87.5 | 182.0 | 72.1 |
| Comparative Example 5 | 218.0 | 201.0 | 92.2 | 175.3 | 76.5 |
| Comparative Example 6 | 240.9 | 211.5 | 87.8 | 197.1 | 56.2 |
| Comparative Example 7 | 256.3 | 232.4 | 90.7 | 189.1 | 38.2 |

Example 11

A nickel composite oxide obtained using a known method in which the mole number ratio of nickel, manganese, and cobalt was Ni:Mn:Co=55.0:25.0:20.0 (D50 particle size: 12.8 μm) was sufficiently mixed with lithium hydroxide and zirconium oxide using a shaker mixer device (model: TURBULA Type T2 C manufactured by Willy A. Bachofen (WAB) AG) to prepare a raw material mixture. At this time, the raw materials were weighed so that the ratio of the number of atoms of zirconium (Zr) in zirconium oxide to the total number of atoms of nickel, manganese, and cobalt was 0.5 at %. The raw materials were weighed so that Li/Me was 1.025 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 2 hours in an oxygen-containing atmosphere having an oxygen concentration of 85 vol % and the balance being nitrogen, and subsequently heated to 970° C. and retained for 5 hours to perform firing.

The lithium-nickel composite oxide after firing was crushed with a jet mill to obtain a positive electrode active material including the lithium-nickel composite oxide particles.

The obtained positive electrode active material was observed with an SEM, and as a result, it was confirmed that the lithium-nickel composite oxide particles included a large number of single primary particles and a small number of secondary particles at a number proportion of the single primary particles of 73.0%. The positive electrode active material had an average primary particle size of 1.7 μm, and a D50 of 1.8 μm. Tables 5 and 6 show the evaluation results.

Example 12

A nickel composite oxide obtained using a known method in which the mole number ratio of nickel, manganese, and cobalt was Ni:Mn:Co=85.0:10.0:5.0 (D50 particle size: 4.5 μm) was sufficiently mixed with lithium hydroxide and zirconium oxide using a shaker mixer device (model: TURBULA Type T2 C manufactured by Willy A. Bachofen (WAB) AG) to prepare a raw material mixture. At this time, the raw materials were weighed so that the ratio of the number of atoms of zirconium (Zr) in zirconium oxide to the total number of atoms of nickel, manganese, and cobalt was 0.5 at %. Furthermore, the raw materials were weighed so that Li/Me was 1.02 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 700° C. and retained for 2 hours in an oxygen-containing atmosphere having an oxygen concentration of 90 vol % and the balance being nitrogen, and subsequently heated to 900° C. and retained for 10 hours to perform firing.

The lithium-nickel composite oxide after firing was crushed to obtain a positive electrode active material including the lithium-nickel composite oxide particles.

The obtained positive electrode active material was observed with an SEM, and as a result, it was confirmed that the lithium-nickel composite oxide particles included a large number of single primary particles and included secondary particles at a number proportion of the single primary particles of 52.1%. The positive electrode active material had an average primary particle size of 2.4 μm, and a D50 of 7.9 μm. Tables 5 and 6 show the evaluation results.

Example 13

A positive electrode active material was obtained in the same manner as in Example 12 except that the raw material mixture was heated to 700° C. and retained for 2 hours, and subsequently heated to 870° C. and retained for 10 hours to perform firing.

The obtained positive electrode active material was observed with an SEM, and as a result, it was confirmed that the lithium-nickel composite oxide particles included secondary particles and single primary particles at a not small number proportion of the single primary particles of 36.0%. The positive electrode active material had an average primary particle size of 1.4 μm, and a D50 of 7.4 μm. Tables 5 and 6 show the evaluation results.

Comparative Example 81

A nickel composite oxide obtained using a known method in which the mole number ratio of nickel, manganese, and cobalt was Ni:Mn:Co=55.0:25.0:20.0 (D50 particle size: 12.8 μm) was sufficiently mixed with lithium hydroxide and zirconium oxide using a shaker mixer device (model: TURBULA Type T2 C manufactured by Willy A. Bachofen (WAB) AG) to prepare a raw material mixture. At this time, the raw materials were weighed so that the ratio of the number of atoms of zirconium (Zr) in zirconium oxide to the total number of atoms of nickel, manganese, and cobalt was 0.5 at %. The raw materials were weighed so that Li/Me was 1.025 that represents the ratio of the number of atoms of lithium (Li) to the number of atoms of metals other than lithium (Me) in the raw material mixture. Note that the nickel composite oxide was obtained by heat-treating a nickel composite hydroxide obtained using a crystallization method.

This raw material mixture was heated to 600° C. and retained for 2 hours in an oxygen-containing atmosphere having an oxygen concentration of 85 vol % and the balance being nitrogen, and subsequently heated to 950° C. and retained for 7 hours to perform firing.

The lithium-nickel composite oxide after firing was crushed with a hammer mill to obtain a positive electrode active material including the lithium-nickel composite oxide particles.

The obtained positive electrode active material was observed with an SEM, and as a result, it was confirmed that the lithium-nickel composite oxide particles included almost only secondary particles at a number proportion of the single primary particles of 0.6%. The positive electrode active material had an average primary particle size of 1.9 μm, and a D5 of 12.5 μm. Tables 5 and 6 show the production conditions and the evaluation results.

TABLE 5

| | Mole number ratio (molar ratio) | | | Positive electrode active material | | | | | | |
|---|---|---|---|---|---|---|---|---|---|---|
| | | | | Number proportion of single primary | | Average primary particle | Specific surface area | Eluted Li amount | | Degree of |
| | Li(a) | Ni(b) | M(c) | particles (%) | D50(μm) | size (μm) | (m²/g) | (mass %) | $I_{(003)}/I_{(104)}$ | circularity |
| Example 11 | 1.025 | 0.547 | Mn 0.249 Co 0.199 Zr 0.005 | 73.0 | 1.8 | 1.7 | 1.46 | 0.054 | 3.24 | 0.94 |
| Example 12 | 1.020 | 0.848 | Mn 0.098 Co 0.049 Zr 0.005 | 52.1 | 7.9 | 2.4 | 1.02 | 0.12 | 2.05 | 0.93 |
| Example 13 | 1.020 | 0.848 | Mn 0.098 Co 0.049 Zr 0.005 | 36.0 | 7.4 | 1.4 | 1.11 | 0.10 | 2.13 | 0.93 |
| Comparative Example 8 | 1.025 | 0.547 | Mn 0.249 Co 0.199 Zr 0.005 | 0.6 | 12.5 | 1.9 | 0.29 | 0.049 | 1.61 | 0.91 |

TABLE 6

| | Coin-type battery | | | Laminate-type battery | |
|---|---|---|---|---|---|
| | Charge capacity (mAh/g) | Discharge capacity (mAh/g) | Charge and discharge efficiency (%) | Discharge capacity (mAh/g) | Capacity retention rate (%) |
| Example 11 | 193.7 | 176.8 | 91.3 | 175.2 | 79.5 |
| Example 12 | 224.6 | 192.5 | 85.7 | 174.0 | 62.3 |
| Example 13 | 229.7 | 201.5 | 87.7 | 181.1 | 56.0 |
| Comparative Example 8 | 195.6 | 174.2 | 89.1 | 173.5 | 73.0 |

(Evaluation Results)

As shown in Tables 1, 3, and 5, in the positive electrode active material in all Examples, $I_{(003)}/I_{(104)}$ was 2.0 or more, and the degree of circularity was 0.93 or more. The positive electrode active material in Examples had a D50 of 10 μm or less and an average primary particle size of 0.8 μm or more, and included particles having a number proportion of single primary particles of at least 30% or more.

Meanwhile, in the positive electrode active material in Comparative Examples, $I_{(003)}/I_{(104)}$ was 1.98 or less, and the degree of circularity was 0.92 or less. Furthermore, the positive electrode active material in Comparative Examples had a high ratio of the secondary particles at a number proportion of the single primary particles of 5.6% or less, and included polycrystalline particles.

Tables 2, 4, and 6 show that every comparison between Example and Comparative Example of the same composition (for example, Example 1 and Comparative Example 1 in Table 2, or Example 5 and Comparative Example 4 in Table 4) clarifies that the capacity retention rate is higher and the cycle characteristic is more improved in Example than in Comparative Example.

INDUSTRIAL APPLICABILITY

In the present embodiment, a positive electrode active material for a lithium ion secondary battery having high thermal stability and excellent battery characteristics can be obtained by an industrial production method. This lithium ion secondary battery is suitable for a power source of a small portable electronic device (such as a notebook personal computer or a mobile phone terminal) that is required to have a high capacity all the time.

Furthermore, the secondary battery using the positive electrode active material according to the present embodiment is excellent in thermal stability and further excellent in capacity also in comparison with a battery using a conventional positive electrode active material of a lithium-nickel-based oxide. Therefore, the secondary battery can be downsized, so that the secondary battery is suitable for a power source for electric cars that are restricted in a mounting space.

Furthermore, the secondary battery using the positive electrode active material according to the present embodiment can be used not only as a power source for electric cars driven purely by electric energy but also as a power source for so-called hybrid cars that is used together with a combustion engine such as a gasoline engine or a diesel engine, and as a stationary storage battery.

Note that, the technical scope of the present invention is not limited to the aspects described in the above embodiments and the like. One or more of the requirements described in the above embodiments and the like may be omitted. Furthermore, the requirements described in the above embodiments and the like can be combined as appropriate. In addition, to the extent permitted by law, the disclosure of Japanese Patent Application Nos. 2019-157719 and 2019-157720, which are Japanese patent applications, and all the literatures cited in this specification is incorporated as part of the description of the text.

REFERENCE SIGNS LIST

CBA Coin-type battery
PE Positive electrode (electrode for evaluation)
NE Negative electrode
SE1 Separator
GA Gasket
WW Wave washer
PC Positive electrode can
NC Negative electrode can
LBA Laminate-type battery (laminate cell)
PS Positive electrode sheet
NS Negative electrode sheet
SE2 Separator
AS Aluminum laminate sheet
TL Tab lead

The invention claimed is:

1. A positive electrode active material for a lithium ion secondary battery, the positive electrode active material comprising a lithium-nickel composite oxide having a hexagonal layered structure and configured by single primary particles or by single primary particles and secondary particles with a plurality of aggregated primary particles,
    wherein a number proportion of the single primary particles to all of the single primary and secondary particles is 30% or more,
    elements constituting the lithium-nickel composite oxide include lithium (Li), nickel (Ni), and optionally at least one element M (M) selected from the group consisting of Co, Mn, Al, V, Mg, Mo, Ca, Cr, Zr, Ti, Nb, Na, K, W, Fe, Zn, B, Si, P, and Ta,
    a mole number ratio of the elements is represented as Li: Ni: M=a: b: c (provided that, $0.95 \leq a \leq 1.10$, $0.30 \leq b \leq 1.00$, $0.00 \leq c \leq 0.70$, and b+c=1), a ratio of a (003) diffraction peak intensity $I_{(003)}$ to a (104) diffraction peak intensity $I_{(104)}$ ($I_{(003)}/I_{(104)}$) is 2.0 or more, the (003) diffraction peak intensity and the (104) diffraction peak intensity determined from X-ray diffraction measured using a flat plate sample holder of a Bragg Brentano optical system using a Cu-kα ray as an X-ray source,
    a degree of circularity is 0.93 or more and 1.00 or less, the degree of circularity determined with a flow image analysis method using a wet flow particle size/shape analyzer, and
    the positive electrode active material has a specific surface area of 1.0 m²/g or more and 5.0 m²/g or less, and the specific surface area is determined with a nitrogen adsorption method.

2. The positive electrode active material for a lithium ion secondary battery according to claim 1, wherein the positive electrode active material has a volume-based median diameter (D50) of 10 μm or less, and the lithium-nickel composite oxide has an average primary particle size of 0.3 μm or more.

3. A lithium ion secondary battery comprising: a positive electrode; a negative electrode; and a non-aqueous electrolyte, the positive electrode containing the positive electrode active material for a lithium ion secondary battery according to claim 1.

4. The positive electrode active material for a lithium ion secondary battery according to claim 1, wherein a number proportion of the single primary particles to all of the single primary and secondary particles is 50% or more.

* * * * *